United States Patent
Frey et al.

(10) Patent No.: US 7,697,602 B2
(45) Date of Patent: Apr. 13, 2010

(54) METHOD FOR PRE-FILTERING TRAINING SEQUENCES IN A RADIOCOMMUNICATION SYSTEM

(75) Inventors: Thomas Frey, Ulm (DE); Mario Kiessling, Weil der Stadt (DE); Markus Reinhardt, Neu-Ulm (DE); Ingo Viering, Munich (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 980 days.

(21) Appl. No.: 10/566,163

(22) PCT Filed: Jul. 8, 2004

(86) PCT No.: PCT/EP2004/051402

§ 371 (c)(1),
(2), (4) Date: Jun. 7, 2006

(87) PCT Pub. No.: WO2005/013574

PCT Pub. Date: Feb. 10, 2005

(65) Prior Publication Data

US 2007/0121749 A1 May 31, 2007

(30) Foreign Application Priority Data

Jul. 28, 2003 (EP) .................................. 03017077

(51) Int. Cl.
*H03H 7/30* (2006.01)
(52) U.S. Cl. .................. 375/231; 370/292; 379/406.1; 455/67.11
(58) Field of Classification Search ................... 375/231
See application file for complete search history.

(56) References Cited

U.S. PATENT DOCUMENTS

2002/0111142 A1* 8/2002 Klimovitch ................... 455/63
2003/0054828 A1* 3/2003 Dent .......................... 455/450

FOREIGN PATENT DOCUMENTS

WO 01/37442 5/2001

OTHER PUBLICATIONS

Kiessling et al., "Short-term and Long-Term Diagonalization of Correlated MIMO Channels with Adaptive Modulation", IEEE, Sep. 2002.
Kiessling et al., "Performance Analysis of MIMO Maximum Likelihood Receivers with Channel Correlation, Colored Gaussian Noise, and Linear Prefiltering" IEEE 2003, pp. 3026-3030.
Kiessling et al., "Statistical Prefiltering for MIMO Systems with Linear Receivers in the Presence of Transmit Correlation" IEEE 2003, pp. 267-271.

(Continued)

*Primary Examiner*—David C Payne
*Assistant Examiner*—Adolf Dsouza
(74) *Attorney, Agent, or Firm*—Staas & Halsey LLP

(57) ABSTRACT

A training sequence is pre-filtered in a radiocommunication system having an emitter in the form of an antenna device with several antenna systems, thereby making it possible to transmit the training sequences through a pre-filter to said antenna systems side for reradiation by the emitter. Estimation enabling to form the properties of radio transmission channels described by spatial correlations is formed. The prefilter is dimensioned according to the correlations, thereby minimizing the error value of an algorithm used for estimation the channel on a reception side.

11 Claims, 1 Drawing Sheet

OTHER PUBLICATIONS

Kiessling et al., "Statistical Prefiltering for MMSE and ML Receivers with Correlated MIMO Channels"; IEEE 2003, pp. 919-924.

Zhou et al., "Subspace-based (Semi-) Blind Channel Estimation for Block Precoded Space-Time OFDM"; IEEE 2002, pp. 1215-1228.

* cited by examiner

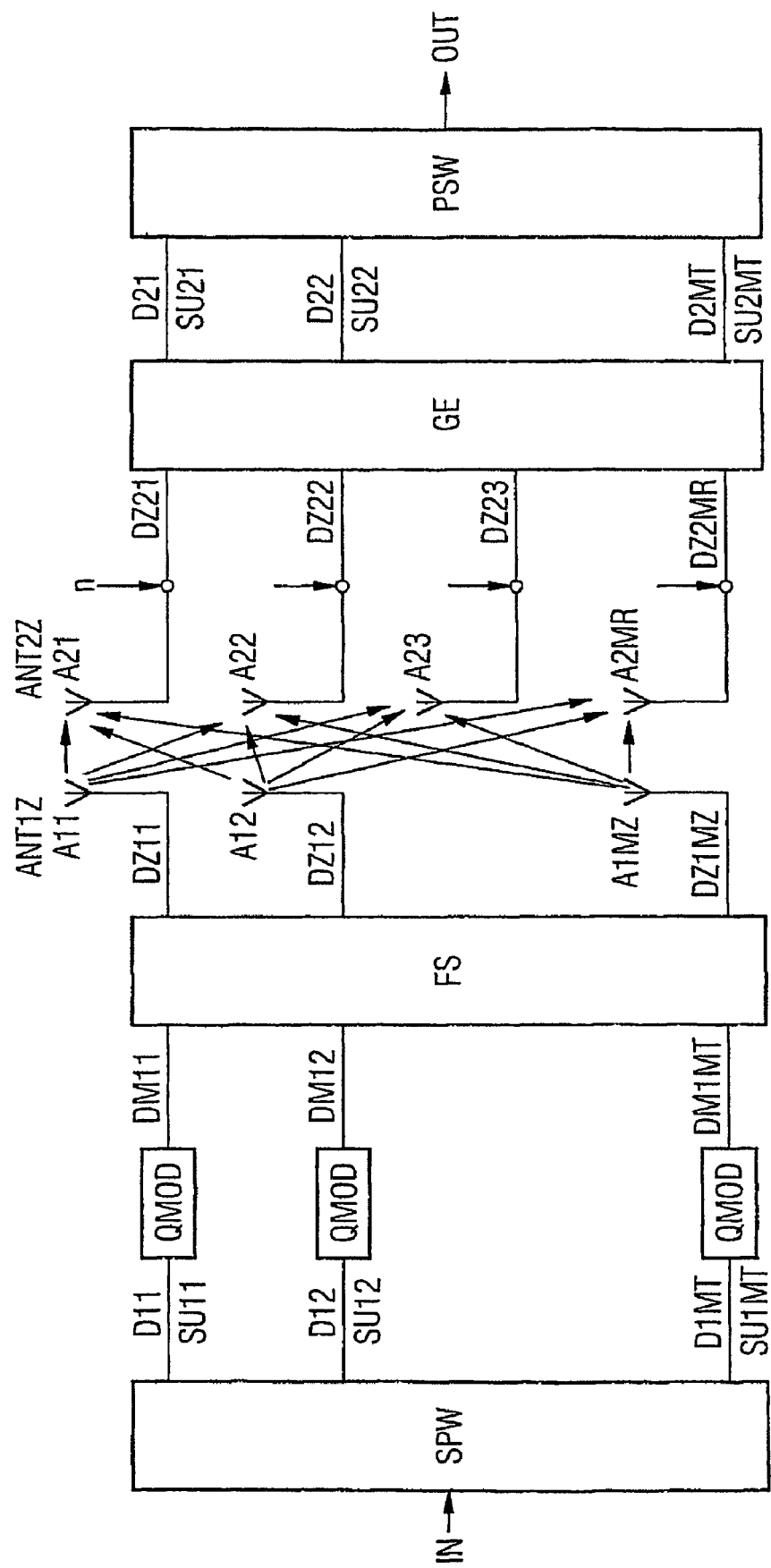

METHOD FOR PRE-FILTERING TRAINING SEQUENCES IN A RADIOCOMMUNICATION SYSTEM

CROSS REFERENCE TO RELATED APPLICATIONS

This application is based on and hereby claims priority to PCT Application No. PCT/EP2004/051402 filed on Jul. 8, 2004 and European Application No. EP03017077 filed on Jul. 28, 2003, the contents of which are hereby incorporated by reference.

BACKGROUND OF THE INVENTION

The invention relates to a method for pre-filtering training sequences in a radio communication system, in which an antenna system comprising a number of antenna elements is used on the transmit side at least.

In the case of radio communication systems, such as mobile radio communication systems, to increase data transmission capacity, antenna systems each comprising a number of antenna elements are used on both the transmit side and the receive side. Such radio communication systems are referred to as so-called Multiple Input Multiple Output or MIMO radio communication systems.

Special signal processing algorithms are used to split a digital input data stream into data sub-streams and emit them via the transmit-side antenna elements. Spatial radio channel coefficients can be derived based on the spatial arrangement of the antenna elements, representing characteristics of radio transmission channels. The radio channel coefficients for example describe signal fading, specific propagation, attenuation, interference, etc. in the radio transmission channel.

The radio channel coefficients are used for example on the transmit side to pre-filter the data sub-streams, to adjust these in an optimum manner to the radio transmission with respect to a higher data throughput or with respect to a higher level of transmission quality. For example pre-filtering brings about an individual transmit power adjustment and/or an individual modulation for every data sub-stream.

In the case of a MIMO radio communication system, radio channel coefficient determination with the aid of channel estimation is very complex. With a number $M_{TX}$ of transmit antennae and a number $M_{RX}$ of receive antennae, a total of $M_{RX} \times M_{TX}$ radio channel coefficients to be estimated therefore results for $M_{RX} \times M_{TX}$ radio transmission channels. Specifically, for a MIMO radio communication system with four transmit and four receive antennae, a total of 16 radio transmission channels results described by 16 radio channel coefficients.

In the case of an FDD (Frequency Division Duplex) radio communication system in particular, precise estimation of the radio channel coefficients requires long training sequences, which in turn take up a considerable number of radio transmission resources.

Transmitter-side pre-filtering of symbols to be sent is known from "Performance Analysis of MIMO Maximum Likelihood Receivers with Channel Correlation, Colored Gaussian Noise, and Linear Prefiltering", Mario Kiessling et al., ICC 2003, IEEE International Conference on Communications, vol. 5, 11.05.2003-15.05.2003, pages 3026 to 3030, XP002270467, USA. The described pre-filtering allows improved receipt of the symbols to be achieved in respect of the bit error rate BER and in respect of the signal to noise ratio SNR, with pre-filtering taking place on the basis of statistical algorithms.

Transmit-side pre-filtering is known from "Statistical Pre-filtering for MIMO Systems with Linear Receivers in the Presence of Transmit Correlation" Kiessling, 57th IEEE Semi-annual Vehicular Technology Conference, VTC 2003, Jeju, South Korea, vol. 1, 22.04.2003-25.04.2003, pages 267-271, XP002270468, for the dimensioning of which there is no need for a precise knowledge of channel state information CSI.

Pre-filtering is carried out based on statistical values.

Further pre-filtering based on statistical values is known from "Statistical Prefiltering for MMSE and ML Receivers with Correlated MIMO Channels", Kiessling, WCNC 2003, IEEE Wireless Communications and Networking Conference Record, New Orleans, La., USA, 16-20.03.2003, vol. 2, pages 919-924, XP002270469.

SUMMARY OF THE INVENTION

One possible object of the invention is therefore to implement an estimation of radio channel coefficients involving little outlay and with greater precision in a radio communication system, in particular in a MIMO radio communication system.

The inventors propose a pre-filter arranged on the transmit side before an antenna system such that training sequences are fed via the pre-filter to antenna elements in the antenna system for emission. Channel estimation takes place based on the training sequences to determine radio transmission channel characteristics, which are described by spatial correlations. The pre-filter is dimensioned as a function of the spatial correlations such that a predefined error value of an algorithm used on the receive side for channel estimation is achieved.

This receive-side error value is for example predefined as an error value to be minimized or a predefined error value is to be achieved by a variation in the length of the training sequences.

The radio transmission channel characteristics are estimated on the receive side with the aid of the training sequences and transmitted to the transmit side for dimensioning the pre-filter. This is the case for example when different carrier frequencies are used for radio transmission in the uplink and in the downlink.

Otherwise the radio transmission channel characteristics are determined on the transmit side as a function of a transmission method used. This is the case for example when different time slots of a carrier frequency are used for radio transmission in the uplink from a mobile station to a base station and in the downlink from a base station to a mobile station. As in this case there is essentially no difference between the radio transmission channel characteristics in the uplink and in the downlink, the radio transmission channel characteristics can be determined directly on the part of the base station from the uplink and are therefore available directly to the base station on the transmit side.

The proposed pre-filter allows better channel estimation than a radio communication system without pre-filtering. The improvement is achieved with respect to the mean squared error in particular when an algorithm is used on the receive side to form a mean squared error value, referred to as an MSE algorithm. It also allows the use of shortened training sequences in compliance with a predefined error value.

The fact that the training sequences can be shortened for a predefined error value with the aid of the pre-filter means that radio transmission resources can be saved, advantageously making them available for payload transmission.

The outlay required to estimate the radio channel coefficients is reduced and the estimation is simplified, as on the one hand only static information with long-term stability relating to the spatial correlation conditions for every radio transmission channel or antenna element is used for pre-filtering or channel estimation. On the other hand the outlay required for the channel estimation calculations is reduced by the use of shortened training sequences.

Pre-filter dimensioning should particularly advantageously only be carried out at fairly long time intervals based on the slow change in radio channel coefficients.

When estimating the radio channel coefficients, influences affecting the radio transmission channel, e.g. fading, are taken into account.

The method for pre-filtering can also be used with so-called Multiple Input Single Output MISO radio communication systems as well as MIMO radio communication systems.

In the case of a MISO radio communication system, a number of transmit antenna elements, in some instances operated as an intelligent antenna system or smart antenna, are used on the transmit side, while only a single antenna element is arranged on the receive side.

The method is advantageously based on the knowledge that in the case of a typical free space propagation the radio transmission channels or the transmit or receive antenna elements assigned respectively to the radio transmission channels are correlated spatially with respect to each other. This means that the radio channel coefficients have to be determined precisely in particular with a direct free line of sight, as they only change over quite a long observation period.

BRIEF DESCRIPTION OF THE DRAWING

These and other objects and advantages of the present invention will become more apparent and more readily appreciated from the following description of the preferred embodiments, taken in conjunction with the accompanying drawing of which:

FIG. 1 schematically shows a typical MIMO radio communication system in a general form by way of an example.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

FIG. 1 shows a block circuit diagram of a MIMO radio communication system. A digital input signal IN, having serially consecutive bits, reaches a serial/parallel converter SPW on the transmit side, with the aid of which the input signal IN is split into a total of MT data sequences D11, D12, . . . , D1MT for MT transmit-side sub-channels SU11, SU12, . . . , SU1MT Each individual MT transmit-side sub-channel SU11 to SU1MT has a modulator QMOD to modulate the individual data sequences D11 to D1MT, with the data sequences D11 to D1MT being modified here with the aid of an identical modulation method.

Modulated data sequences DM11, DM12, . . . , DM1MT pass via a pre-filter FS for emission to a transmit-side antenna unit ATN1Z, having a total of MZ individual antenna elements A11, A12, . . . , A1MZ. A receive-side antenna unit ANT2Z, having a total of MR individual antenna elements A21, A22, . . . , A2MR, is used to receive MR data sequences DZ21, DZ22, . . . , DZ2MR. These each have a noise element, represented by a noise vector n.

The MR data sequences DZ21 to DZ2MR reach a matrix filter GE, which forms MT data sequences D21, D22, . . . , D2MT for MT receive-side sub-channels SU21, SU22, . . . , SU2MT. The data sequences D21 to D2MT reach a parallel/serial converter PSW, which forms an output signal OUT with serially consecutive bits. The characteristics of the transmission channels can be combined as radio channel coefficients in a matrix.

The pre-filtering is derived by way of an example below for an algorithm used on the receive side to form a minimum mean squared error value or MMSE algorithm.

It is assumed that the transmit-side training sequences are fed orthogonally with respect to each other to the transmit-side pre-filter for pre-processing.

The following abbreviations are used below:
I designates a unit matrix
$M^*$ designates a conjugated complex matrix M
$M^T$ designates a transposed matrix M
$M^H$ designates a conjugated transposed matrix M (hermitian matrix)
$[M]_{ij}$ designates an element of a line i and a column j of a matrix M
vec(M) forms a vector from columns of a matrix M
$\otimes$ designates a Kroneck product
$\mathrm{diag}(M) = \mathrm{diag}(M)^T$ forms a diagonal matrix with elements x on the diagonal In the case of a MIMO radio communication system a transmission of a training sequence via a radio transmission channel with white noise at the receiver is modeled by:

$$Y = R_{\tilde{n}\tilde{n}}^{-0.5} HFS + R_{\tilde{n}\tilde{n}}^{-0.5} \tilde{N} = R_{\tilde{n}\tilde{n}}^{-0.5} HFS + N \qquad \text{Equation (1)}$$

where:
$N_t$ is the training sequence length,
$M_{Tx}$ is the number of antenna elements on the transmit side,
$M_{Rx}$ is the number of antenna elements on the receive side,
S is the transmit-side training sequence matrix for the variable $M_{TX} \times N_t$,
F is the linear matrix of the transmit-side pre-filter, variable $M_{TX} \times M_{TX}$,
H is the radio transmission channel matrix with correlated radio channel coefficients, variable $M_{TX} \times M_{RX}$,
$\tilde{N}$ is the measured receive-side noise matrix before a "noise-whitening" noise filter, variable $M_{Rx} \times N_t$,
N is the receive-side noise matrix with white noise after the "noise-whitening" noise filter, variable $M_{Rx} \times N_t$,
$R_{\tilde{n}\tilde{n}}$ is the estimated noise covariance matrix according to equation (5),
Y is the measured, noisy, receive-side training sequence matrix, variable $M_{Rx} \times N_t$.

In the case of orthogonal training sequences, the transmit-side training sequence matrix S satisfies the following condition for a discrete Fourrier transformation matrix or DFT matrix:

$$SS^H = S^H S = N_t I \qquad \text{Equation (2)}$$

If we break the noise matrix down into $\tilde{N}$ column vectors where:

$$\tilde{N} = [\tilde{n}_1, \ldots, \tilde{n}_{N_t}] \qquad \text{Equation (3)}$$

then the noise covariance matrix $R_{\tilde{n}\tilde{n}}$ in equation (1) is as follows as the expected value E where $1 \leq i \leq N_t$:

$$R_{\tilde{n}\tilde{n}} = E[\tilde{n}_i \tilde{n}_i^H] \qquad \text{Equation (4)}$$

The covariance matrix of the columns of the noise matrix N in equation (1) assumes the value of the unit matrix I for white Gaussian noise.

An estimation of the radio channel coefficients is considered below using the receive-side MMSE algorithm and using the pre-filter assumed to be known.

To this end equation (4) is converted to a vector notation:

$$\underbrace{vec(Y)}_{y} = \underbrace{((FS)^T \otimes R_{\tilde{n}\tilde{n}}^{-0,5})}_{X} \cdot \underbrace{vec(H)}_{h} + \underbrace{vec(N)}_{n} \quad \text{Equation (5)}$$

$$y = X \cdot h + n,$$

where h, n, y are column vectors.

If the column vectors h, n have the covariance matrices $R_{hh}$ and $R_{nn}$, a linear MMSE channel estimation of the column vector h is carried out according to an equation known from the publication "Fundamentals of statistical signal processing volume 1 (estimation theory)", Kay S. M., Prentice Hall, 1993.

The following estimated value results for the column vector h:

$$\hat{h} = (R_{hh}^{-1} + X^H R_{nn}^{-1} X)^{-1} X^H R_{nn}^{-1} y \quad \text{Equation (6)}$$

where $R_{hh}$ is the covariance matrix of the column vector h and $R_{nn}$ is the covariance matrix of the column vector n.

As shown below, the matrix X is a function of the covariance matrix $R_{hh}$. In the case of white noise the covariance matrix $R_{nn}$ assigned to the column vector n corresponds to the unit matrix I.

A simplified model of a correlated MIMO radio transmission channel is known from the publication "Fading correlation and its effect on the capacity of multielement antenna systems", Shiu, Foschini, Gans, Kahn, *IEEE Transactions on Communications*, vol. 48, no. 3, pp. 502-513, March 2000.

The following thereby applies by way of an example for both the transmit-side and receive-side correlation of antenna elements or radio transmission channels for the radio transmission channel matrix H:

$$H = A^H H_W B \quad \text{Equation (7)}$$

$$AA^H = R_{Rx} \quad \text{Equation (8)}$$

$$BB^H = R_{Tx} \quad \text{Equation (9)}$$

where:

$AA^H$ is the matrix root, defined using $R_{Rx}$, $BB^H$ is the matrix root, defined using $R_{Tx}$, $H_W$ is the complex radio transmission channel matrix with Gaussian variables of a unit variance, variable $M_{Rx} \times M_{Tx}$, H is the radio transmission channel matrix with correlated radio channel coefficients, variable $M_{TX} \times M_{RX}$, $R_{Rx}$ is the standard receive-side correlation matrix with long-term stability with radio channel coefficients, variable $M_{RX} \times M_{RX}$, and $R_{Tx}$ Is the standard transmit-side correlation matrix with long-term stability with radio channel coefficients, variable $M_{TX} \times M_{TX}$, The following results when using the channel model specified above:

$$R_{hh} = R_{Tx}^* \otimes R_{Rx} \quad \text{Equation (10)}$$

With the specified channel model a mean squared error value MSE $\epsilon$ is derived:

$$\epsilon = tr((R_{Tx}^*)^{-1} \otimes R_{Rx}^{-1} + N_t(F^*F^T \otimes R_{\tilde{n}\tilde{n}}^{-1}))^{-1} \quad \text{Equation (11)}$$

Trace has hereby been abbreviated to "tr".

Assuming that statistical information is available about radio channel coefficients on the transmit side and receive side, taken into account as $R_{Tx}$ and $R_{Rx}$ in equation (11), a linear pre-filter F can be proposed correspondingly, taking into account a minimum error $\epsilon$.

Additive superimposition with white Gaussian noise at the receiver is considered below and a closed solution is derived for the MMSE algorithm.

The following applies:

$$R_{\tilde{n}\tilde{n}} = N_0 \cdot I \quad \text{Equation (12),}$$

where $N_0$ is the noise power.

This gives an error value $\epsilon$ of:

$$\varepsilon = tr\left((R_{Tx}^*)^{-1} \otimes R_{Rx}^{-1} + \frac{N_t}{N_0}(F*F^T \otimes I)\right)^{-1}. \quad \text{Equation (13)}$$

Based on this equation the pre-filter is proposed below for different propagation scenarios.

On the one hand the transmit-side pre-filtering and optimum adjustment of the training sequences to the radio transmission channel allow a better estimation of the radio channel coefficients and on the other hand it is possible to shorten the transmit-side training sequences with a predefined error value $\epsilon$.

Eigenvalue decomposition is carried out below with the eigenvalues $\Lambda_{Rx}$ and $\Lambda_{Tx}$. The following applies:

$$R_{Rx} = V_{Rx} \Lambda_{Rx} V_{Rx}^H$$

$$R_{Tx}^* = V_{Tx} \Lambda_{Tx} V_{Tx}^H \quad \text{Equation (14)}$$

where $R_{Rx}$ is the receive-side correlation matrix, $R_{Tx}$ is the transmit-side correlation matrix, $V_{Rx}$ is the eigenvectors ($v_{R1}, v_{R2}, \ldots, v_{R,MRx}$) of the receive-side correlation matrix $R_{Rx}$, $V_{Tx}$ is the eigenvectors ($v_{T1}, v_{T2}, \ldots, v_{Tx,MTx}$) of the transmit-side correlation matrix $R_{Tx}$, $\Lambda_{RX}$ is the eigenvalues ($\Lambda_{R1}, \Lambda_{R2}, \ldots, \Lambda_{R,MRx}$) of the receive-side correlation matrix $R_{Rx}$, and $\Lambda_{Tx}$ is the eigenvalues ($\Lambda_{T1}, \Lambda_{T2}, \ldots, \Lambda_{T,MTx}$) of the transmit-side correlation matrix $R_{Tx}$.

An eigenvalue $\Lambda_{Ti}$ (i=1, \ldots, $M_{Tx}$) with an assigned eigenvector $V_{Ti}$ (i=1, \ldots, $M_{Tx}$) should be designated as a so-called "long-term eigenmode" of the radio transmission channel, as long-term characteristics relating to the correlation are described here. A large eigenvalue relating to an average power to be transmitted thereby identifies a strong eigenmode.

The transmit-side training sequence matrix S and the transmit-side eigenvectors $V_{Tx}$ can be described respectively line by line as:

$$S = \begin{bmatrix} s_1 \\ s_2 \\ \vdots \\ s_{M_{TX}} \end{bmatrix} \quad \text{Equation (15)}$$

$$V_{TX}^* = \begin{bmatrix} v_1 & v_2 & v_{M_{TX}} \end{bmatrix}$$

The pre-filter is described by:

$$F^* = V_{Tx}\Phi_f \quad \text{Equation (16)}$$

where $\Phi_f$ is the diagonal matrix, by which transmit power is assigned to the eigenmodes or training sequences to be transmitted.

The following therefore applies for pre-filtering the training sequences:

$$F \cdot S = V_{Tx}^* \Phi_f S \quad \text{Equation (17)}$$

This equation on the one hand describes an assignment of power to the training sequences, carried out with the aid of the vector $\Phi_f$, and on the other hand beam forming, carried out with respect to the training sequences with the aid of the eigenvectors $V_{Tx}^*$ of the transmit-side correlation matrix $R_{Tx}$.

A sequence of transmit vectors defined in a matrix $T_k$ is emitted via the transmit antennae for a training sequence $s_k$. The following applies:

$$T_k = \Phi_k V_k s_k \quad \text{Equation 18}$$

for all k.

Equation (18) can be interpreted as the beam forming of a training sequence $s_k$ with an eigenvector $v_k$, with a power $\Phi_k$ being assigned to the training sequence $s_k$.

The following results from equation (13) for the error value $\epsilon$:

$$\varepsilon = tr\left(\Lambda_{Tx}^{-1} \otimes \Lambda_{Rx}^{-1} + \frac{N_t}{N_0}(V_{Tx}^H F^* F^T V_{Tx} \otimes I)\right)^{-1} \quad \text{Equation (19)}$$

The following results for the error value $\epsilon$ with the diagonal matrix $\Phi_f$ for transmit power assignment:

$$\varepsilon = tr\left(\Lambda_{Tx}^{-1} \otimes \Lambda_{Rx}^{-1} + \frac{N_t}{N_0}(\Phi_f \Phi_f^H \otimes I)\right)^{-1} \quad \text{Equation (20)}$$

In a first exemplary embodiment both a receive-side and a transmit-side correlation of the antenna elements or radio transmission channels is considered below.

The error value $\epsilon$ from equation (20) is minimized below with the aid of the transmit-side pre-filter. Assuming a power restriction, the following optimization problem results:

$$\min_{\Phi_f} tr\left(\Lambda_{Tx}^{-1} \otimes \Lambda_{Rx}^{-1} + \frac{N_t}{N_0}(\Phi_f \Phi_f^H \otimes I)\right)^{-1}, \quad \text{(Equation 21)}$$

with the secondary condition of the power restriction being defined by $\rho$ where:

$$\rho = \sum_{l=0}^{M_{Tx}} \Phi_{f,l}^2 \quad \text{Equation (22)}$$

The error value is minimized taking into account the secondary condition by numerical calculation and optimization methods.

In a second exemplary embodiment a solely transmit-side correlation of the antenna elements or radio transmission channels is considered below. This example describes a typical scenario in a cellular radio communication system with a free-standing antenna system.

In matrix notation the following applies for elements of the diagonal matrix $\Phi_f$:

$$\Phi_f = \left[\frac{1}{M_{Tx}}\left(\left(\frac{N_t}{N_0}\right)^{-1} tr(\Lambda_{Tx}^{-1}) + \rho\right) \cdot I - \left(\frac{N_t}{N_0}\right)^{-1}\Lambda_{Tx}^{-1}\right]^{0.5} \quad \text{Equation (23)}$$

with the secondary condition that all elements of the diagonal matrix $\Phi_f$ are greater than 0. This can be ensured for example by using an iterative method.

In a third exemplary embodiment a solely receive-side correlation of antenna elements is considered below.

The result is that all the elements of the diagonal matrix $\Phi_f$ are of the same order. The following applies:

$$\Phi_f = \rho/M_{Tx} I \quad \text{Equation (24)}$$

In this special case there is only undirected transmission without beam forming.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v DIRECTV*, 69 USPQ2d 1865 (Fed. Cir. 2004).

The invention claimed is:

1. A method for pre-filtering training sequences used for a channel estimation of radio transmission characteristics in a radio communication system, in which an antenna arrangement having a plurality of antenna elements is used on a transmit side, comprising:
   feeding the training sequences via a pre-filter to the antenna elements on the transmit side;
   receiving the training sequences after transmission and using the training sequences to estimate radio transmission characteristics, which are described by spatial correlations,
   using the pre-filter to adjust the training sequences to the radio transmission channel characteristics, to thereby improve the channel estimation;
   dimensioning the pre-filter as a function of the spatial correlations to achieve a predefined error value of an algorithm used for channel estimation, wherein the training sequences are pre-filtered based on the following equation:

$$F \cdot S = V_{Tx}^* \Phi_f S$$

where:
   S is a transmit-side training sequence matrix,
   F is a transmit-side pre-filter matrix,
   $V_{Tx}$ are eigenvectors of a transmit-side correlation matrix formed of transmit-side radio channel coefficients having long-term stability, and
   $\Phi_f$ is a diagonal matrix for power assignment.

2. The method according to claim 1, wherein
   the predefined error value is a receive-side error value, and
   the predefined error value is a minimum error value which is defined based on a length of the training sequences, or the predefined error value is achieved by adjusting the length of the training sequences.

3. The method according to claim 2, wherein an MSE algorithm is used to estimate the radio channel characteristics on a receive side.

4. The method according claim 3, wherein
a beam forming method is implemented by the pre-filter for every training sequence, and
in the beam forming method, the pre-filter assigns both a power and an antenna element to each training sequence.

5. The method according to claim 1, wherein an MSE algorithm is used to estimate the radio channel characteristics on a receive side.

6. The method according claim 1, wherein
a beam forming method is implemented by the pre-filter for every training sequence, and
in the beam forming method, the pre-filter assigns both a power and an antenna element to each training sequence.

7. The method according to claim 1, wherein the diagonal matrix $\Phi_f$ is formed based on an MSE error value $\epsilon$ using the following formula:

$$\varepsilon = tr\left(\Lambda_{Tx}^{-1} \otimes \Lambda_{Rx}^{-1} + \frac{N_t}{N_0}(\Phi_f \Phi_f^H \otimes I)\right)^{-1}$$

where
$N_t$ is a training sequence length,
$N_0$ is a noise power,
$I$ is the identity matrix,
$\Lambda_{Rx}$ are eigenvalues of a receive-side correlation matrix formed of receive-side radio channel coefficients having long-term stability,
$\Lambda_{Tx}$ are eigenvalues of the transmit-side correlation matrix formed of transmit-side radio channel coefficients having long-term stability.

8. The method according to claim 7, wherein the MSE error value $\epsilon$ is minimized for a transmit-side and a receive-side correlation of radio transmission channels or antenna elements in respect of the diagonal matrix $\Phi_f$ based on the following formula:

$$\min_{\Phi_f} tr\left(\Lambda_{Tx}^{-1} \otimes \Lambda_{Rx}^{-1} + \frac{N_t}{N_0}(\Phi_f \Phi_f^H \otimes I)\right)^{-1}$$

with a power restriction being defined as a secondary condition based on the following formula:

$$\rho = \sum_{l=0}^{M_{Tx}} \Phi_{f,l}^2.$$

9. The method according to claim 1, wherein the following applies for a transmit-side correlation of radio transmission channels or antenna elements of the diagonal matrix $\Phi_f$:

$$\Phi_{f,l} = \left[\frac{1}{M_{Tx}}\left(\left(\frac{N_t}{N_0}\right)^{-1} tr(\Lambda_{Tx}^{-1}) + \rho\right) \cdot I - \left(\frac{N_t}{N_0}\right)^{-1}\Lambda_{Tx}^{-1}\right]^{0,5}$$

with a secondary condition $\Phi_{f,l} \geqq 0$.

10. A transmit station and/or a receive station of a radio communication system with means, which are embodied to implement the method according to claim 1.

11. A transmitter to pre-filtering training sequences used for estimating radio transmission characteristics in a radio communication system, comprising:
an antenna system comprising a plurality of antenna elements to transmit training sequences; and
a pre-filter through which the training sequences are fed before transmission by the antenna system, the pre-filter being dimensioned as a function of spatial correlations of the antenna elements, to achieve a predefined error value in an algorithm used for channel estimation, wherein the training sequences are pre-filtered based on the following equation:

$$F \cdot S = V_{Tx} * \Phi_f S$$

where:
S is a transmit-side training sequence matrix,
F is a transmit-side pre-filter matrix,
$V_{Tx}$ are eigenvectors of a transmit-side correlation matrix formed of transmit-side radio channel coefficients having long-term stability, and
$\Phi_f$ is a diagonal matrix for power assignment.

* * * * *